United States Patent [19]
Yoshitsugu et al.

[11] 4,345,782
[45] Aug. 24, 1982

[54] PASSIVE SEATBELT SYSTEM FOR MOTOR VEHICLES

[75] Inventors: Noritada Yoshitsugu; Masanao Motonami; Mitsuaki Katsuno, all of Toyota, Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 879

[22] Filed: Jan. 4, 1979

[30] Foreign Application Priority Data
Apr. 3, 1978 [JP]  Japan .............................. 53-43571[U]

[51] Int. Cl.³ ............................................. B60R 21/10
[52] U.S. Cl. ...................................... 280/803; 297/469
[58] Field of Search ....................... 280/803, 804, 802; 297/469, 475

[56] References Cited
U.S. PATENT DOCUMENTS

| | | | |
|---|---|---|---|
| 3,754,776 | 8/1973 | Cataldo et al. | 280/803 |
| 3,857,581 | 12/1974 | Kaneko | 280/803 X |
| 3,995,884 | 12/1976 | Bauer et al. | 280/804 |
| 4,225,154 | 9/1980 | Takada | 297/469 X |

Primary Examiner—John A. Pekar
Attorney, Agent, or Firm—Stevens, Davis, Miller & Mosher

[57] ABSTRACT

A passive seatbelt driving system for a vehicle including a stroke amplifying means having variable amplification coupled to a door of the vehicle for amplifying the opening and closing strokes of the door, a take-up pulley driven by the amplified strokes from the stroke-amplifying means and a wire wound on the take-up pulley and coupled to a seatbelt such that when the door is opened the take-up pulley is driven by the amplified strokes from the stroke-amplifying means to pull the seatbelt away from the seat in the vehicle to provide sufficient space to enter or leave the vehicle regardless of the amount by which the door is opened.

6 Claims, 7 Drawing Figures

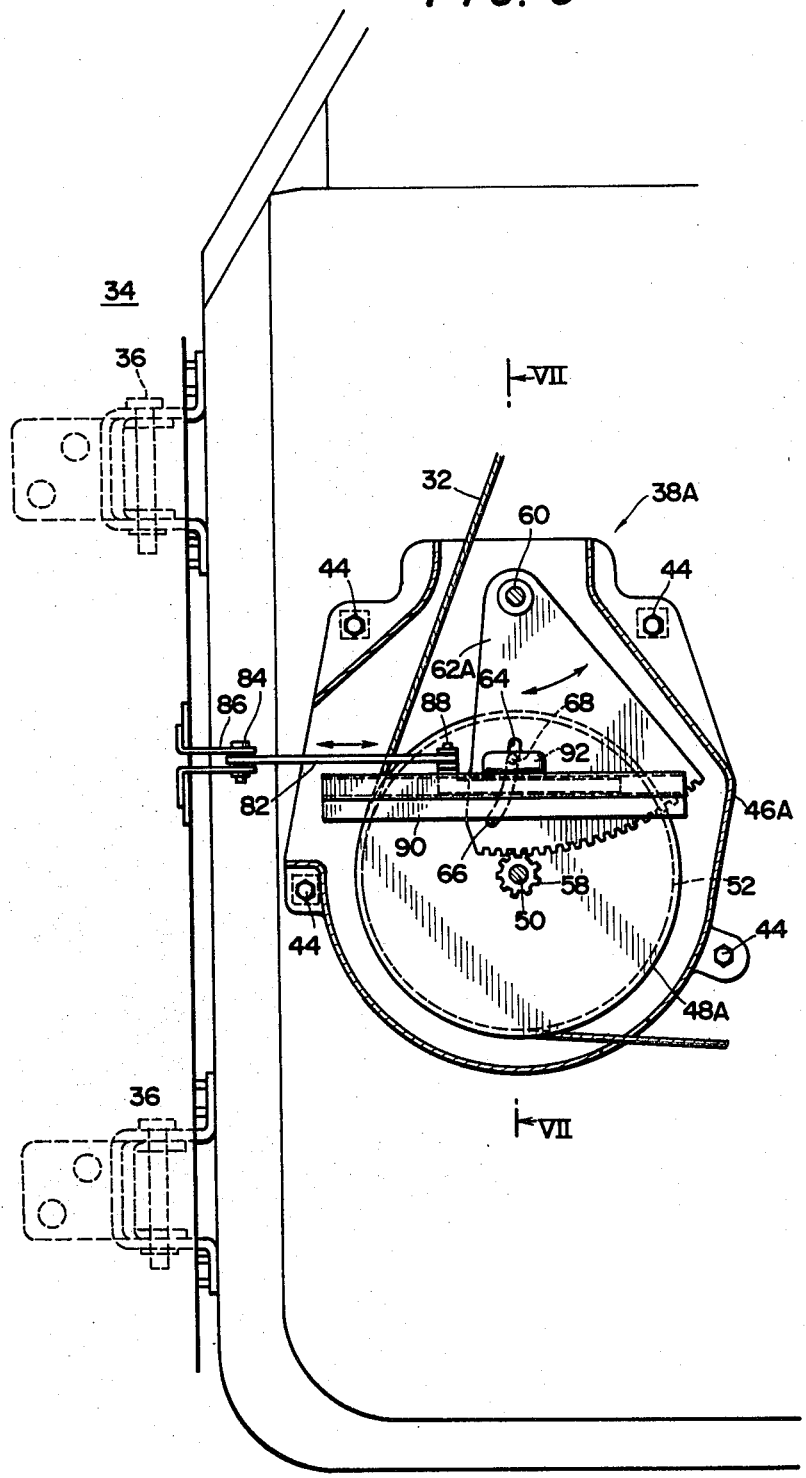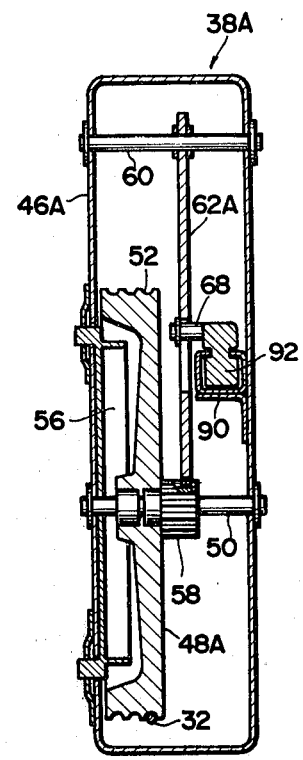

PASSIVE SEATBELT SYSTEM FOR MOTOR VEHICLES

BACKGROUND OF THE INVENTION

1. Field of the Invention

This invention relates to passive seatbelt systems in which the passenger is automatically caused to don the passenger seatbelt after entering the vehicle.

2. Prior Art

Although seatbelt systems are exceptionally effective in insuring the safety of passengers during vehicular emergencies, the percentage of passengers who wear seatbelts is extremely low because of the difficulty in donning the seatbelts, etc. As a result, various types of passive seatbelt systems have been proposed which make it possible to automatically fasten the passenger restraining seatbelt around the passenger after the passenger has entered the vehicle.

A typical system of this type is generally designed such that the outboard end of the seatbelt is anchored to the motor vehicle door and a motor installed inside the door is used to cause an intermediate portion of the seatbelt to move away from or approach the passenger seat in response to the opening or closing of the door. In passive seatbelt systems which use such a motor, however, costs are increased by the installation of the motor and a motor actuating sensor. Furthermore, the motor noise and the motor actuation timing also create problems and therefore the discomfort of the passenger is increased.

As a result, passive seatbelt systems have been proposed in which the opening and closing force of the door is used to cause an intermediate portion of the seatbelt to move away from or approach the passenger seat during opening or closing of the door so that there is no need for the driving force of a motor. In such passenger seatbelt system, however, the amount of space between the intermediate portion of the seatbelt and the passenger seat is proportional to the amount by which the door is opened or closed. Accordingly, such systems suffer from the drawback that when the door is not sufficiently opened, there is always insufficient space for the passenger to enter or leave the vehicle.

SUMMARY OF THE INVENTION

Accordingly, it is the general object of the present invention to provide a passive seatbelt driving system which always makes it possible for the passenger to obtain a sufficient amount of space to enter or leave the vehicle regardless of the amount by which the door is opened or closed.

The objects of the present invention are accomplished by a unique passive seatbelt driving system for a vehicle including a stroke-amplifying means having variable amplification coupled to a door of the vehicle for amplifying the opening and closing strokes of the door, a take-up pulley driven by the amplified strokes from the stroke amplifying means and a wire wound on the take-up pulley and coupled to a seatbelt such that when the door is opened the take-up pulley is driven by the amplified strokes from the stroke-amplifying means to pull the seatbelt away from a seat in a vehicle to provide sufficient space to enter or leave the vehicle regardless of the amount by which the door is opened and such that when the door is closed the take-up pulley is driven by the amplified strokes from the stroke-amplifying means to allow the seatbelt to move toward the passenger seat.

BRIEF DESCRIPTION OF THE DRAWINGS

The above mentioned features and objects of the present invention will become more apparent with reference to the following description in conjunction with the accompanying drawings, wherein like reference numerals denote like elements, and in which:

FIG. 6 is a magnified cross section illustrating a second embodiment in accordance with the teachings of the present invention; and FIG. 7 is a cross section view along the line VII—VII in FIG. 6.

DETAILED DESCRIPTION OF THE INVENTION

Figure 1:
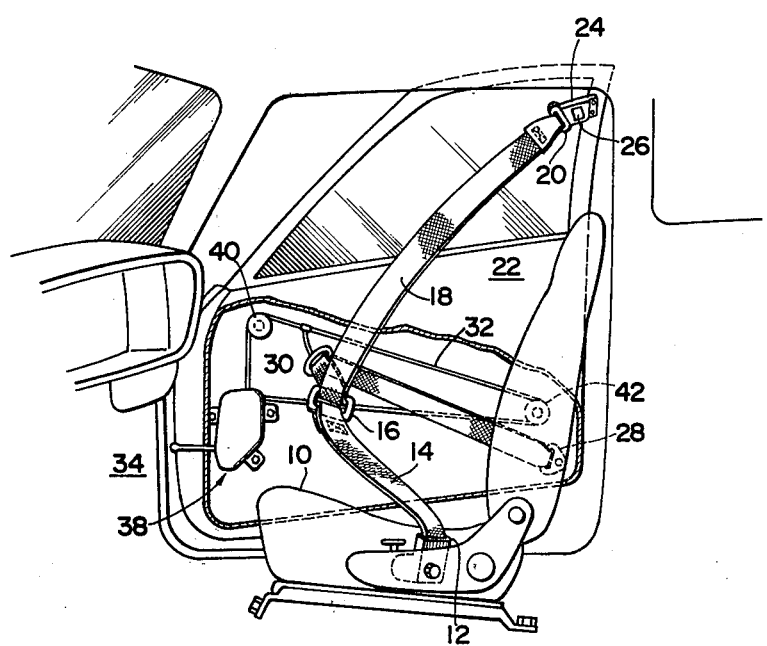
FIG. 1 is an oblique view of a vehicle interior illustrating a first embodiment of a passive seatbelt driving system in accordance with the teachings of the present invention.

Referring more particularly to the Figures, shown in FIGS. 1 through 4 is a first embodiment of a passive seatbelt driving system in accordance with the teachings of the present invention. In the Figures, a retractor 12 is installed on the inner side of the passenger seat 10, i.e. on the side of the seat 10 which faces the center line of the vehicle. The inner seatbelt 14 is power-retracted by this retractor 12. The retractor 12 is equipped with inertial locking mechanism (not shown in the Figures) so that extension of the inner seatbelt 14 is instantly stopped during a vehicular emergency.

A ring joint 16 is fastened to the tip of the inner seatbelt 14. An intermediate portion of an outer seatbelt 18 is folded through the ring joint 16 such that it can pass freely through the ring joint 16. A tongue plate 20 is fastened to one end of the outer seatbelt 18. This tongue plate 20 is caused to engage with a buckle 24 which is fastened to the upper interior side of the vehicle door 22. This buckle 24 is used for emergency release purposes. The tongue plate 20 and the buckle 24 are designed such that the tongue plate 20 can be easily removed from the buckle 24 by pressing a release button 26. In addition, the other end of the outer seatbelt 18 is anchored to an outer anchor 28 which is fastened to the bottom part of the door 22.

A slip ring 30, which acts as a guide for the intermediate portion of the outer seatbelt 18, is attached such that it is free to slide along the length of the outer seatbelt 18 between the outer anchor 28 and the ring joint 16. This slip ring 30 is fastened to a wire 32 which is strung inside the door 22.

Figure 2:
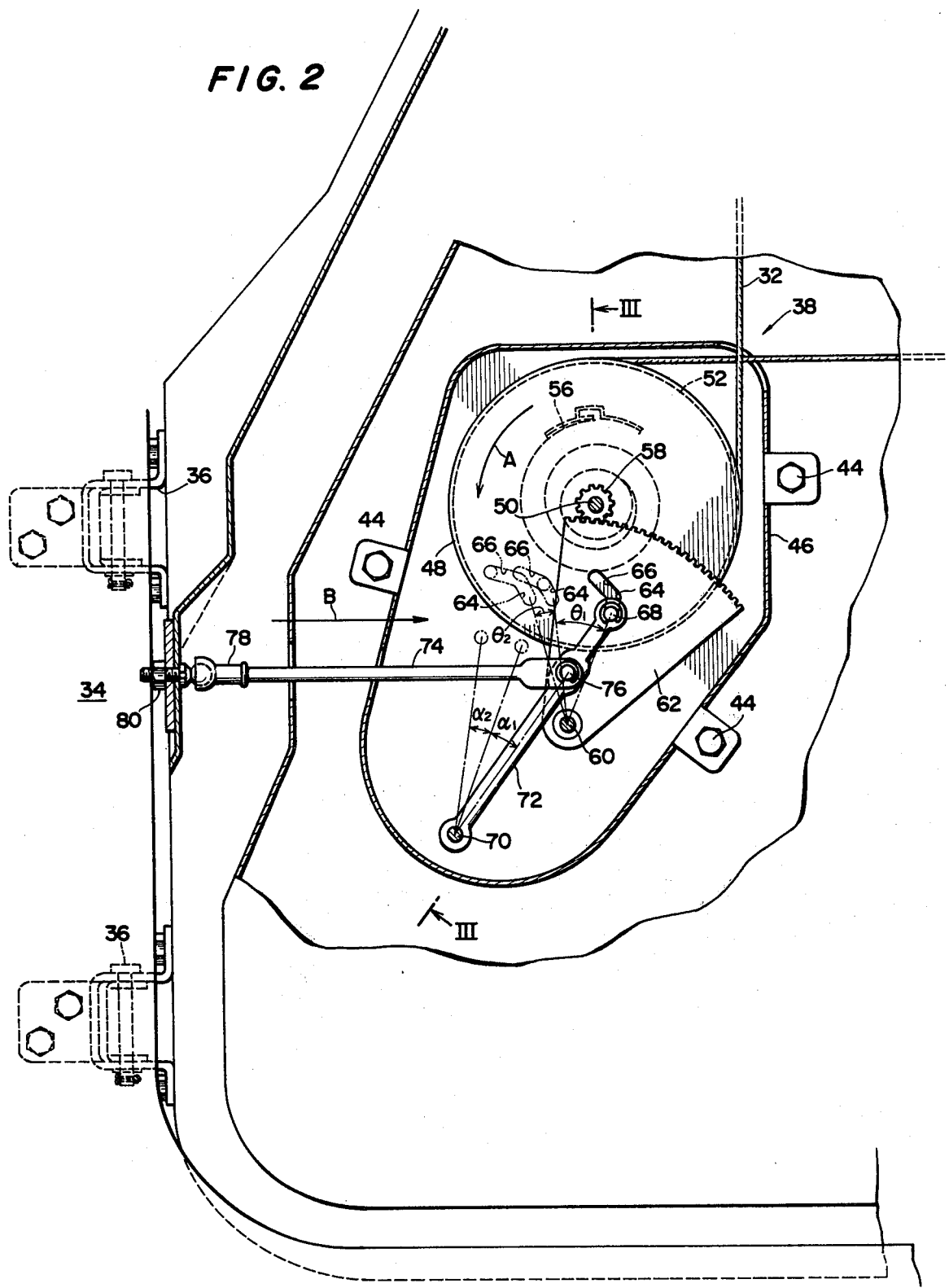
FIG. 2 is a magnified cross section of the essential parts of the system of FIG. 1.

One end of the wire 32 is taken out by a driving system 38 which is installed inside the door 22 in the vicinity of the hinges 36 used to install the door 22 on the vehicle 34 (see FIG. 2). The other end of the wire 32 is turned around a guide pulley 40 which is mounted near the hinges 36 of the door 22 above the driving system 38. This end of the wire is then turned around a guide pulley 42 which is mounted at the opposite end of the door 22, i.e. on the bottom part of the door 22 at a point located at the outer end of the radius of rotation of the door 22. Next, this end of the wire 32 is taken up by the driving system 38. Accordingly, when the wire 32 is taken up in one direction by the driving system 38, the slip ring 30 is caused to approach the guide pulley 40 so that the intermediate portion of the outer seatbelt 18 is caused to move toward the front of the vehicle (as shown in FIG. 1). Therefore, a sufficient space for entering or leaving the vehicle is maintained between the seatbelts 14 and 18 and the passenger seat 10. When the driving system 38 causes the wire 32 to move in the opposite direction, the slip ring 30 is caused to move toward the guide pulley 42 such that an intermediate portion of the seatbelts 14 and 18 is caused to approach the passenger seat 18. It is therefore possible to cause the seatbelt to adhere closely to the passenger seated in the passenger seat 10 such that the passenger is restrained. Furthermore, a slot (not shown in the Figures) which linearly connected to the pulleys 40 and 42 is installed in the door 22 in order to facilitate transmission of the motion of the wire 32 to the slip ring 30.

Figure 3:
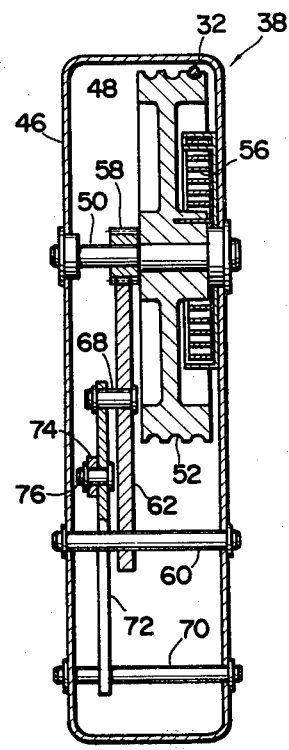
FIG. 3 is a cross section view along the line III—III in FIG. 2.
Figure 4:
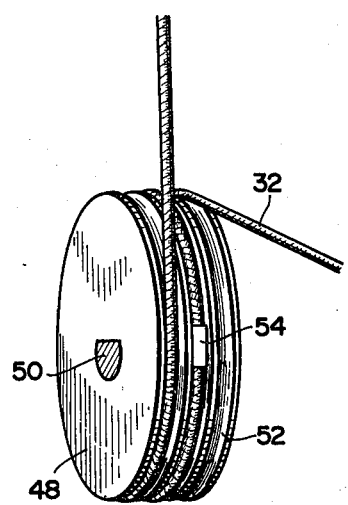
FIG. 4 is an oblique view of the take-up pulley utilized in the present invention.

Driving parts of the driving system 38 are accommodated inside a steel plate case 46 which is fastened in place inside the door 22 by a plurality of fastening bolts 44 (as shown in FIGS. 2 and 3). A shaft 50 of the take-up pulley 48 is mounted inside the steel case 46. A spiral take-up groove 52 is formed around the circumference of the take-up pulley 48. The ends of the wire 32, which enter the steel plate case 46 perpendicular to each other, are taken up on the take-up groove 52. The ends of the wire 32 are taken up in mutually opposite directions. As is shown in FIG. 2, the end of the wire 32 which enters the case 46 after being turned around the pulley 40 is taken up in a clockwise direction while the end of the wire 32 which enters the case 46 after being turned around the guide pulley 42 is taken up in a counterclockwise direction. As is shown in FIG. 4, both ends of the wire 32 are taken up in mutually opposite directions. However, since take-up groove 52 is a spiral-form groove, both ends of the wire 32 meet at an intermediate point in the take-up groove 52 and are connected to each other and anchored to the take-up pulley 48 by means of a wire retaining part 54.

A spring 56 is installed between the take-up pulley 48 and the steel plate case 46 such that the take-up pulley 48 is driven in a counterclockwise direction with reference to FIG. 2, i.e. in the direction indicated by the arrow A. Accordingly, the slip ring 30, which is connected to an intermediate portion of the wire 32, is driven toward the guide pulley 42 shown in FIG. 1.

Furthermore, a pinion 58 is coaxially mounted on the take-up pulley 48. This pinion 58 engages with a sector gear 62 which is supported in the steel case 46 by means of a shaft 60. The gear diameter of the sector gear 62 is several times greater than that of the pinion gear 58. Accordingly, a slight rotation of the sector gear 62 causes the take-up pulley 48 to rotate several revolutions.

Force-receiving slots 64 and 66, one end of each of which connects with the end of the other slot so that together the two slots form a single slot which is shaped roughly like a very shallow V, are formed in an intermediate portion of the sector gear 62. The force-receiving slot 64 runs roughly in the direction of the radius of the sector gear 62 with the shaft 60 taken as the center. The force-receiving slot 66 which is located further outward in a radial direction from the force-receiving slot 64 is roughly tangential to the sector gear 62. As the sector gear 62 transmits the opening force of the door 22 to the pinion 58, the inclination of the force-receiving slot 66 tends to become horizontal, i.e., the slot 66 tends to orient itself in the opening/closing direction of the door, that is in the direction indicated by the arrow B.

A force-receiving pin 68 is inserted into the force-receiving slots 64 and 66. This force-receiving pin is supported such that it can rotate on the end of the arm 72 which pivots on a shaft 70 mounted in the steel case 46. The shaft 70 of the arm 72 is located farther from the center of the take-up pulley 48 than is the center of rotation of the sector gear 62, i.e. the shaft 60. In addition, the shaft 70 is located near the hinges 36 of the door 22 than is the shaft 60 so that straight lines connecting the shafts 70, 60 and 50 form a triangle. Furthermore, one end of the connecting arm 74 is supported on a pin 76 located at an intermediate point on the arm 72. A ball joint 78 fastened to the other end of the connecting arm 74 projects horizontally, i.e. in the opening/closing direction of the door, to the outside of the steel plate case 46 and the door 22 and is fastened to the vehicle 34 by means of a nut 80. Accordingly, when the door 22 is opened, the connecting arm 74 causes the opening force of the door 22 to be transmitted as the pivoting force of the arm 72 and the sector gear 62. The pivoting force applied to the sector gear 62 is transmitted as rotation to the pinion 58 and the take-up pulley 48 is caused to rotate in a opposite direction from the direction indicated by the arrow A such that the slip ring 30 is caused to approach the guide pulley 40 as shown in FIG. 1.

In operation, when a passenger opens the door 22 in order to enter the vehicle, the door 22 moves away from the vehicle 34, i.e. moves in the direction indicated by the arrow B. Accordingly, the connecting arm 74 causes the arm 72 and the sector gear 62 to pivot in a counterclockwise direction with reference to FIG. 2. As a result, the pinion 58 and the take-up pulley 48 are caused to rotate against the force of the spring 56 in a direction opposite to the direction indicated by the arrow A. The rotation of the take-up pulley 48 is amplified by the combination of the sector gear 62 and the pinion 58. Accordingly, the slip ring 30 shown in FIG. 1 is able to complete a large movement proportional to the distance travelled by the door 22. As a result, the slip ring 30 approaches the guide pulley 40. Therefore, the slip ring 30 causes an intermediate portion of the outer seatbelt 18 to move away from the passenger seat 10 so that sufficient space is maintained between the seatbelt 18 and the passenger seat 10 for the passenger to enter or leave the vehicle. After the passenger enters the vehicle, the closing motion of the door causes the connecting arm 74 to rotate the sector gear 62 in an opposite direction. The rotation, in the direction indicated by the arrow A, of the take-up pulley 48 caused by the sector gear 62 is transmitted with the force of the spring 56 as a movement of the wire 32 which causes the slip ring 32 to approach the guide pulley 42. As a result, the end of the outer seatbelt 18 approaches the passenger seat 10 so that the passenger is securely restrained by the seatbelts 14 and 18. Furthermore, changes in the length of the seatbelts 14 and 18 which accompany the receding motion of the outer seatbelt 18 from the seat 10 are compensated for by appropriate retraction or extension of the inner seatbelt 14 by the retractor 12.

If the vehicle is involved in an emergency such as a collision, while the passenger is wearing the seatbelt, extension of the seatbelt 14 will be instantly stopped by the inertial locking mechanism in the retractor 12. Accordingly, the passenger will be securely restrained by the seatbelts 14 and 18 so that his safety is insured. In order to escape to the outside of the vehicle after the emergency, it is necessary merely to press the release button 26 on the buckle 24. When this button is pressed, one end of the outer seatbelt 14 is freed from the door 22 so that the passenger can easily open the door 22 and escape to the outside of the vehicle.

Following is the description of the relationship between the opening and closing force of the door and the movement of the slip ring 30. As is shown in FIG. 2, when the connecting arm 74 causes the arm 72 to rotate through an angle $\alpha_1$ during the initial opening of the door, the sector gear 62 is caused by the pin 76 to rotate through an angle $\theta_1$. During the movement of the sector 62 through the angle $\theta_1$, the force-receiving pin 68 of the arm 72 moves inside the force-receiving slot 64. When arm 72 rotates through an angle $\alpha_2$ as the door is opened further, the sector gear 62 is caused by the force-receiving pin 68 to rotate through an angle $\theta_2$. During this rotation through the angle $\theta_2$, the force-receiving pin 68 moves inside the force-receiving slots 68.

Figure 5:
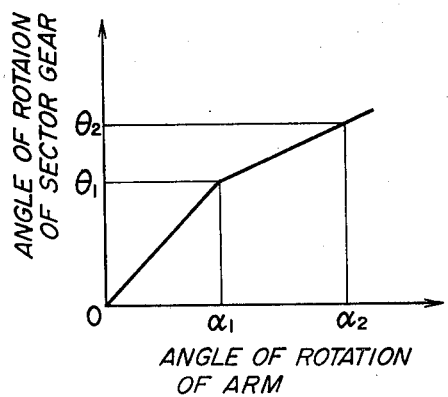
FIG. 5 is a graph illustrating the relationship between the angle of rotation of the sector gear and the angle of rotation of the arm.

In other words, during the rotation of the sector gear 62 through the angle $\theta_1$, the force-receiving pin 68 is inside the force-receiving slot 64. Since the axis of the force-receiving slot 64 runs roughly in the direction of the radius of the sector gear 62, the sector gear 62 receives almost the entire movement of the connecting arm 74. However, during the movement of the sector gear 62 through the angle $\theta_2$, the force-receiving pin is inside the force-receiving slot 66. Accordingly, since the axis of the force-receiving slot 66 is roughly tangential to the sector gear 62, the force-receiving pin 68 does not transmit the entire movement of the connecting arm 74 to the sector gear 62 and the movement of the connecting arm 74 is reduced in transmission to the sector gear 62. Accordingly, as shown in FIG. 5, the angle of rotation of the sector gear 62 and, the amount of the wire driven by the take-up pulley 48, show a relative decrease as the angle of rotation $\alpha$ of the arm 74 increases. Thus, even if the passenger opens the vehicle door 22 to only a slight angle, the amplifying mechanism consisting of the sector gear 62 and the pinion 58 causes the space between the seatbelts 14 and 18 and the passenger seat to be sufficient so that the passenger can easily enter or leave the vehicle. Afterwards, even if the passenger should open the door further, the movement of the seatbelts 14 and 18 relative to the passenger seat is very slight.

Referring to FIGS. 6 and 7, shown therein is a second embodiment of a seatbelt driving system in accordance with the teachings of the present invention. In this second embodiment, a connecting arm 82 is supported by a pin 84 on a bracket 86 attached to the vehicle 34. The other end of the connecting arm 82 is supported by a pin 88 on a slide piece 92 which runs along a slide rail 90 fastened to the bottom of the steel plate case 46. A force-receiving pin 68 is also fastened to the slide case 92. This force-receiving pin 68 is inserted in force-receiving slots 64 and 66 formed in the sector gear 62 such that the sector gear 62 is driven by the force-receiving pin 68. Thus, in this second embodiment, a slide piece 92, which is installed such that it is free to move in the opening/closing direction of the door, is installed one at end of the connecting arm 82. By means of this, it is possible to obtain the same effect as in the first embodiment while reducing the total number of parts required. The remaining elements are substantially same as those in the first embodiment and a description of their operation and interconnection is omitted.

In each of the above described embodiments, gears were used as the mechanism for amplifying the opening and closing strokes of the door. It should be apparent, however, that other mechanisms which accomplish this purpose could be utilized without departing from the spirit and scope of the invention. In addition, it should be clear that the wire could be replaced with other elongated members such as cable, plastic line, etc.

In the above description, it is apparent that the passive seatbelt driving system provided by this invention amplifies the opening and closing strokes of the door and transmits these amplified strokes to a wire member used to move the seatbelt. Furthermore, in this invention, the movement of the wire member is decreased during the final stage of the door opening. As a result, this invention possesses an additional advantage of providing an automatic seatbelt fastening operation even in passive seatbelt systems which do not require the driving force of a motor.

It should be apparent to those skilled in the art that the above described embodiments are merely illustrative of but a few of many specific embodiments which represent the application of the principles of the present invention. Numerous and varied other arrangements can be readily devised by those skilled in the art without departing from the spirit and scope of the invention.

We claim:

1. A passive seatbelt system for a vehicle which automatically removes the seatbelt from the passenger or fastens said seatbelt to the passenger when the vehicle doors are opened or closed, comprising:

a take-up pulley which is supported on the vehicle door;

an elongated member wound on said take-up pulley and coupled to said seatbelt for causing movement of the passenger-restraining seatbelt; and a stroke-amplifying means installed between the take-up pulley and the vehicle body for amplifying the opening and closing strokes of the door and transmitting said opening and closing strokes to said take-up pulley, said stroke-amplifying means comprising:

a pinion which is connected with the take-up pulley, a sector gear which is supported on the door and which engages with the pinion, and a speed reducing means for reducing the amount of opening and closing stroke of the door only during the final stage of opening of said door whereby the rotational speed of the take-up pulley during the final stage of opening the door decreases, said speed reducing means comprising a slot formed in the sector gear, said slot having a portion being oriented along a direction of the opening and closing stroke of said door when said door is opened beyond a specified angle;

wherein a force receiving pin which engages with said slot is installed on the end of an arm pivotally supported on the door such that said arm pivots when the door is opened or closed.

2. A seatbelt system as defined in claim 1, wherein said stroke-amplifying means comprises a connecting arm installed between the arm and the vehicle body, so that the sector gear is caused to rotate by the opening and the closing of the door.

3. A passive seatbelt system for a vehicle which automatically removes the seatbelt from a passenger seated in said vehicle or fastens said seatbelt around said seated passenger as the passenger's door is respectively opened or closed in relation to the body of said vehicle, said system comprising:

a take-up pulley having a first axis of rotation fixed in location with respect to said door;

an elongated member wound about said take-up pulley and coupled to an intermediate portion of said seatbelt so as to cause said seatbelt to move towards a removed position as said pulley is rotated in a first angular direction about said first axis;

a pinion gear connected to said take-up pulley and co-axial therewith so as to rotate about said first axis as said pulley is rotated;

a sector gear in engagement with said pinion gear and having a second axis of rotation fixed in location with respect to said door and parallel to said first axis, the effective pitch diameter of said sector gear being several times that of said pinion gear;

linkage means supported by said door and having a first end pivotally fastened to said vehicle body and a second end constrained to move in a plane perpendicular to said second axis along a defined path extending from an initial point corresponding to said door being in its fully closed position to a final point corresponding to said door being in its fully opened position for converting the opening and closing movements of said door relative to said body into corresponding back and forth movement of said second end along said path; and variable rate coupling means connected between said second end and said sector gear for converting said back and forth movements of said second end into corresponding rotational movements of said sector gear in said second and first angular directions such that when said second end moves along said path by a specified angular amount relative to said second axis, the resultant angular rotation of said sector gear is substantially greater when said second end is nearer said initial point and is substantially less when said second end is nearer said final point.

4. The passive seatbelt system of claim 3, wherein said linkage means comprises:

a first arm having one end thereof pivotally fastened to said vehicle body and another end pivotally fastened to a second arm, said second arm being pivotally supported by said door about a third axis parallel to said second axis and spaced therefrom, whereby said one end of said first arm functions as said first end of said linkage means, and a point on said second arm spaced apart from said third axis functions as said linkage means second end.

5. The passive seatbelt system of claim 3 wherein said linkage means comprises:

a slide rail supported by said door and fixed in position with respect thereto;

a slide piece in sliding engagement with said slide rail; and an arm having one end thereof pivotally fastened to said vehicle body and another end connected to said slide piece, whereby said one end of said arm functions as said linkage means first end, and a point on said slide piece functions as said linkage means second end.

6. The passive seatbelt system of claim 4 or 5, wherein said variable rate coupling means comprises:

a force receiving surface on said sector gear, said surface having an initial portion oriented in a relatively more radial direction with respect to said second axis and a final portion oriented in a relatively less radial and more circumferential direction with respect to said second axis, said initial portion corresponding to a first range of positions of said door from fully closed to an intermediate open position and said final portion corresponding to a second range of door positions from said intermediate open position to full open, a force transmitting member associated with said second end of said linkage means, said force transmitting member being in sliding engagement with said force receiving surface, whereby during the opening movement of said door from said fully closed position to said intermediate position a given amount of movement at said second end will result in a greater angular movement of said sector gear and a lesser sliding movement of said force transmitting member along said force receiving surface, as compared to the result of the same amount of second end movement during the final opening of said door from said intermediate open position to said fully open position.

* * * * *